United States Patent
Hayee et al.

(10) Patent No.: US 6,714,742 B1
(45) Date of Patent: Mar. 30, 2004

(54) POLARIZATION-DIVISION MULTIPLEXING BASED ON POWER ENCODING OF DIFFERENT POLARIZATION CHANNELS

(75) Inventors: M. Imran Hayee, Ocean, NJ (US); Mustafa C. Cardakli, Los Angeles, CA (US); Alan E. Willner, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 09/574,761

(22) Filed: May 19, 2000

Related U.S. Application Data

(60) Provisional application No. 60/135,313, filed on May 20, 1999.

(51) Int. Cl.$^7$ ................................................. H04J 14/06
(52) U.S. Cl. ........................... 398/65; 398/152; 398/184
(58) Field of Search ................................. 359/122, 156; 398/65, 79, 152, 184

(56) References Cited

U.S. PATENT DOCUMENTS

| | | | | |
|---|---|---|---|---|
| 3,956,626 A | * | 5/1976 | Ross ........................... | 359/184 |
| 5,111,322 A | * | 5/1992 | Bergano et al. ............. | 359/122 |
| 5,299,047 A | * | 3/1994 | Kasturia et al. ............ | 359/156 |
| 5,377,035 A | * | 12/1994 | Wang et al. ................ | 359/156 |
| 5,388,088 A | * | 2/1995 | Gans et al. ................. | 359/122 |
| 6,038,357 A | * | 3/2000 | Pan ............................. | 385/24 |

OTHER PUBLICATIONS

I.P. Kaminow and T. L. Koch, *Optical Fiber Telecommunications IIIA*, CH #12 and #13, New York; Academic Press; 1997.

A. R. Chraplyvy, et al., *IEEE Photonics Technology Letters*, vol. 8, No. 9, 1264–1266, 1996.

M. Midrio, et al., *Journal of Optical Society of America*, vol. 13, No. 7, 1526–1535, Jul. 1996.

Steven G. Evangelides, et al. *Journal of Lightwave Technology*, vol. 10, No. 1, Jan. 1992.

K. Inoue, *IEEE Photonics Technology Letters*, vol. 3, No. 6, 560–563, Jun. 1991.

Inoue, Kyo Arrangement of Orthogonal Polarized Signals for Suppressing Fiber Four–Wave Mixing in Optical Multichannel Transmission Systems *IEEE Phototonics Technology Letters*, vol. 3, No. 6, pp. 560–563, Jun. 1991.

Chraplyvy, A.R. et al. 1–Tb/s Transmission Experiment *IEEE Phototonics Technology Letters*, vol. 8, No. 9, pp 1264–1266, Sep. 1996.

Midrio, M. et al. Polarization shift keying for high–bit–rate multilevel soliton transmissions *J. Opt. Soc. Am. B*/vol. 13, No. 13, No. 7 pp. 1526–1535, Jul. 1996.

Evangelides, Stephen G. et al. Polarization Multiplexing with Solitons *Journal of Lightwave Technology*, vol. 10, No. 1. pp 28–35, Jan. 1992.

\* cited by examiner

*Primary Examiner*—Kinfe-Michael Negash
(74) *Attorney, Agent, or Firm*—Fish & Richardson P.C.

(57) ABSTRACT

Methods and systems for implementing polarization division multiplexing to allow recovery of data in different multiplexed channels at a receiving end without recovering multiplexed polarizations used in the transmitting stage.

22 Claims, 6 Drawing Sheets

POLARIZATION-DIVISION MULTIPLEXING BASED ON POWER ENCODING OF DIFFERENT POLARIZATION CHANNELS

This application claims the benefit of U.S. Provisional Application No. 60/135,313, filed on May 20, 1999.

BACKGROUND

This application relates to optical data processing and communication devices and systems, and more specifically, to techniques and systems for polarization-division multiplexing in digital optical communication devices and systems.

An optical carrier at a carrier wavelength can be used as an optical communication channel to provide a large bandwidth in signal transmission due to its inherent large carrier frequency. Hence, the optical carrier transmitted through an optical link, which may be implemented in either free space or in an optical waveguide (e.g., fiber), can be used in high-speed and broadband communication systems. However, the actual useful bandwidth of a single optical carrier may be limited by a number of factors, including the material dispersion and optical nonlinearities of the optical fiber, and the operating speeds of electronic components associated with the optical channel.

One way to further increase data capacity in an optical link is to simultaneously transmit optical carriers of different wavelengths so that different channels of data can be carried by different carriers and sent over the optical fiber link at the same time. This technique is known as "wavelength-division multiplexing" ("WDM"). To further increase the transmission capacity, dense WDM ("DWDM") techniques have been developed to increase the number of multiplexed wavelengths in a single optical link by reducing the wavelength spacing between two adjacent wavelengths to a few nanometers or even in the sub-nanometer range.

SUMMARY

The techniques and systems disclosed in this application include polarization-division multiplexing ("PDM") to use different states of polarization in a single optical carrier at a transmitting terminal, to multiplex different channels of data to produce a PDM signal for transmission. The respective receiving terminal decodes the received PDM signal, without demultiplexing, to separate the different states of polarization, to extract the different channels of data. Hence, the data capacity of a single optical carrier can be increased. Such a PDM signal at one carrier wavelength may be multiplexed with one or more other PDM signals at different carrier wavelengths in a WDM or DWDM system.

In one implementation, a PDM transmitter is configured to combine first and second optical beams of two different polarizations modulated to respectively carry first and second channels of binary data to produce a polarization multiplexed signal. This signal has unequal power contributions from the two polarizations to have four possible distinct power levels to represent the first and second channels of binary data. A PDM receiver may be designed to receive the polarization multiplexed signal generated by the PDM transmitter and to produce two output signals respectively representing the first and second channels of binary data according to a power level of the polarization multiplexed signal with respect to said four distinct power levels, without recovering said different polarizations.

DETAILED DESCRIPTION

Figure 1:
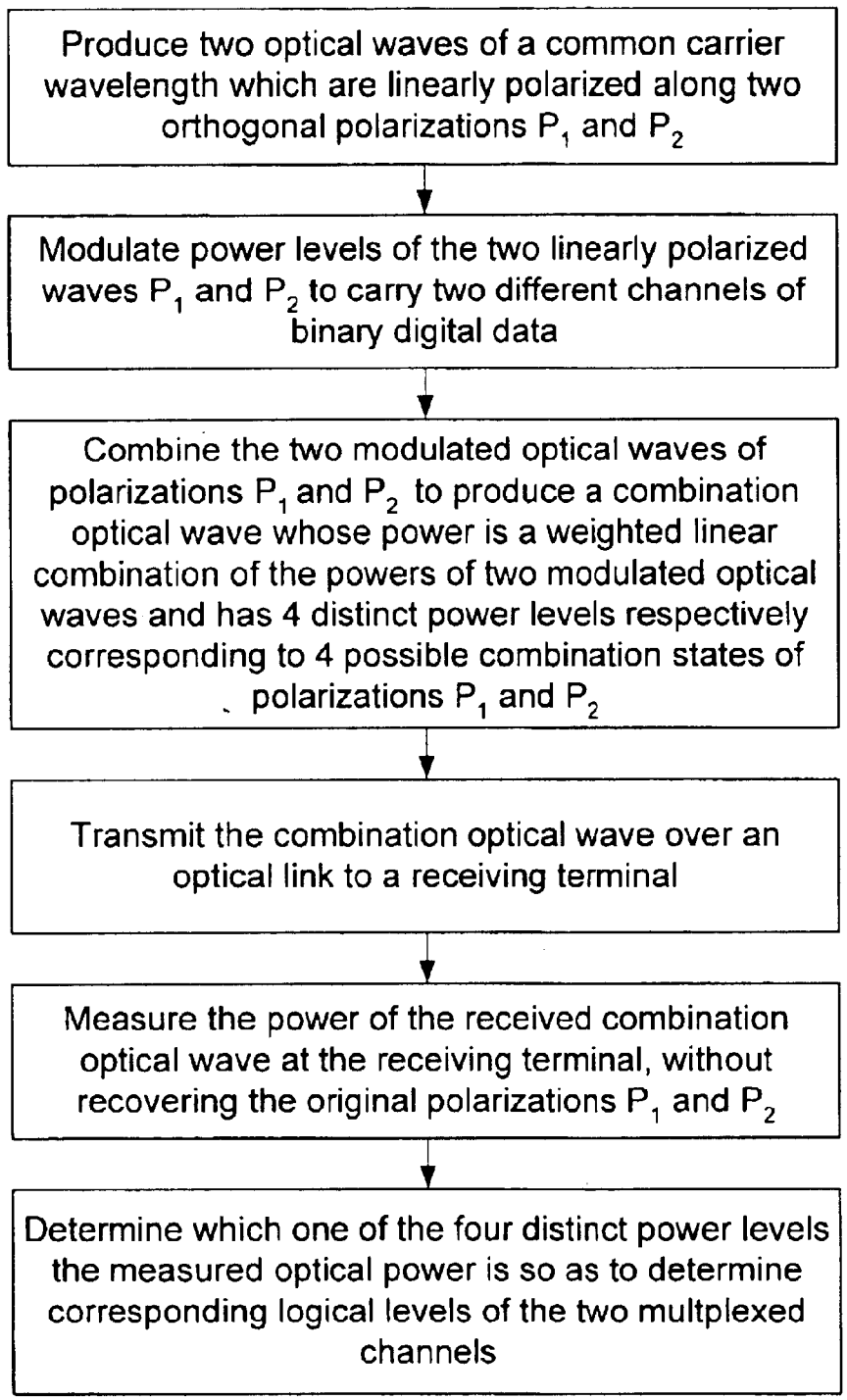
FIG. 1 is a flowchart for implementing a polarization-division multiplexing ("PDM") scheme according to one embodiment of the invention.

The polarization of an optical wave at a carrier wavelength propagating in an optical waveguide such as a fiber link may be represented by a combination of polarization components, $P_1$ and $P_2$, along two mutually orthogonal states of polarization. Conversely, two coherent optical waves with mutually orthogonal states of polarization, $P_1$ and $P_2$, can be combined to form a single combination optical wave whose polarization is a linear combination of $P_1$ and $P_2$. When the polarization components $P_1$ and $P_2$ are in phase or out of phase relative to each other, the polarization of the optical wave is a linear polarization. The optical wave is generally elliptically polarized when the phase difference between $P_1$ and $P_2$ is not $K\pi$ ($K=0, \pm 1, \pm 2, \ldots$). For example, a circular polarization may be achieved if the phase difference is $\pi/2$ or $-\pi/2$ and the amplitudes of $P_1$ and $P_2$ are the same.

The techniques and systems disclosed herein use the above polarization properties of an optical carrier wave to multiplex two channels of digital data respectively carried by separate polarizations $P_1$ and $P_2$ to produce a PDM optical wave. The power of the PDM optical wave, $P_{PDM}$, can be represented by a linear combination of the powers of two orthogonally polarized waves, $P_1$ and $P_2$:

$$PDM = \alpha P_1 + \beta P_2,$$

where $\alpha$ and $\beta$ are PDM coefficients. The power of each polarization can be modulated in the temporal domain between a high level and a low level to respectively represent "1" and "0" of a binary data stream. The low power level in general may be any level that is smaller than the high power level, including zero or a near-zero power.

One feature of the present PDM scheme is that the two different channels of binary data embedded in the PDM optical wave, when received, can be recovered at a receiving terminal directly from the power level of the PDM optical wave at each sampling point. There is no need to decompose the polarization of the PDM optical wave into two orthogonal polarizations P1 and P2 for the recovery. One of advantages of this aspect is that data recovery is essentially not affected by variations in polarization due to transmission, e.g., fluctuations in polarization caused by randomly-varying fiber birefringence. Hence, complex data recovery circuitry for separately recovering data in the polarizations $P_1$ and $P_2$ can be eliminated. The uncertainties in the states of polarization are particularly problematic in WDM systems because the random perturbations to the polarization states of optical signals at different wavelengths are generally different.

The present PDM scheme encodes the two different channels of data in such a way that that the two channels are recovered collectively, rather than separately, at the receiving terminal. After the two polarizations $P_1$ and $P_2$ are used to produce the PDM optical wave, the two polarizations $P_1$ and $P_2$ are no longer relevant to the subsequent data recovery at the receiving terminal. This can be achieved in part by setting PDM coefficients $\alpha$ and $\beta$ at such values so that the power of the PDM optical wave, $\alpha P_1 + \beta P_2$, can have four distinct power levels to unambiguously represent the data of the two different channels of binary data, i.e., two binary levels for the first channel of data in $P_1$ and another two binary levels for the second channel of data in $P_2$.

TABLE 1 shows logical values of the PDM with respect to the logical values of the two multiplexed channels according to the embodiment of the present PDM scheme. It is assumed for simplicity that the power levels representing "1" and "0" in the two polarizations $P_1$ and $P_2$ are the same. Accordingly, PDM coefficients $\alpha$ and $\beta$ are set at different values to achieve the desired four different power levels. Hence, the two channels of data from the two polarizations $P_1$ and $P_2$ are weighted differently with respect to their power levels in the PDM optical wave.

TABLE 1

PDM Truth Table

| Chan. #1 ($P_1$) | Chan. #2 ($P_2$) | PDM $\alpha P_1 + \beta P_2$ ($\alpha \neq \beta$) | PDM $\alpha = 2$, $\beta = 1$ |
| --- | --- | --- | --- |
| 1 | 1 | $\alpha + \beta$ | 3 |
| 1 | 0 | $\alpha$ | 2 |
| 0 | 1 | $\beta$ | 1 |
| 0 | 0 | 0 | 0 |

Columns 1 and 2 represent all four possible combination binary states in the PDM optical wave from the two different channels of data in polarizations $P_1$ and $P_2$. Column 3 shows four different resultant power levels corresponding to the four combination binary states, respectively. TABLE 1 suggests that, PDM coefficients $\alpha$ and $\beta$ should be different in order to distinguish the combination where channel 1 is 1 and channel 2 is 0 from another combination where channel 1 is 0 and channel 2 is 1. One simple and convenient set of values of $\alpha$ and $\beta$ can be $\alpha=2$ and $\beta=1$, the respectively PDM values of which are shown in column 4.

Therefore, the logical levels of the two channels of data can be simultaneously ascertained solely based on the logical levels of the PDM optical wave at the receiving terminal by virtue of the power encoding scheme in the above PDM truth table. The logical levels of the PDM optical wave can be determined by digital decision circuitry from analog electrical signals representing the power levels of the PDM optical wave. For example, if PDM is 2, the logical values for channels 1 and 2 are 1 and 0, respectively. Thus, in the present PDM scheme, the data recovery process essentially has nothing to do with the state of polarization of the PDM optical wave and its relationship with the polarizations $P_1$ and $P_2$ as long as the four distinct power levels are maintained at the receiving end.

FIG. 1 is a flowchart showing an exemplary workflow of the above PDM scheme.

Figure 2:
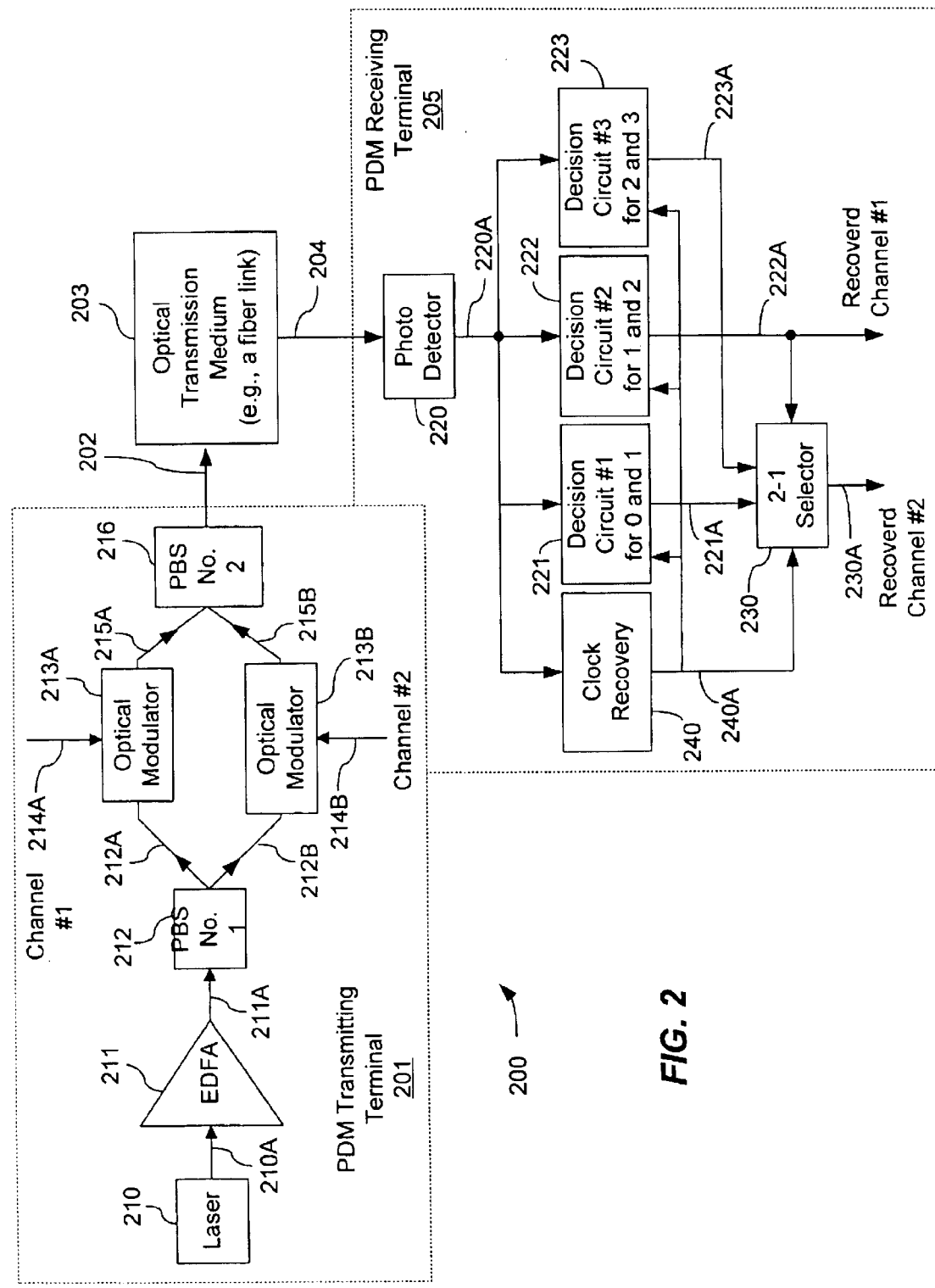
FIG. 2 is a schematic illustrating one embodiment of a PDM transmitting terminal and a respective PDM receiving terminal.

FIG. 2 is a schematic illustrating one embodiment of a PDM system 200 having a PDM transmitting terminal 201 and a respective PDM receiving terminal 205 based on the PDM scheme shown in TABLE 1 and FIG. 1. The PDM transmitting terminal 201 produces a PDM wave 202 which is then transmitted to the PDM receiving terminal 205 through an optical transmission medium, e.g., a fiber link or a fiber optic network. The PDM optical wave 204 may be different from the initial wave 202 due to some polarization-scrambling effect and other effects during the transmission.

The PDM transmitting terminal 201 uses a laser 210, which may include a laser diode, to generate a monochromatic optical beam 210A at a carrier wavelength. An optical amplifier 211, e.g., an Er-doped fiber amplifier, may be placed in the optical path of the beam 210A to produce an amplified beam 211A. The beam 211A is then split into two optical beams 212A and 212B whose polarizations $P_1$ and $P_2$ are mutually orthogonal by, e.g., a polarizing beam splitter 212. Optical modulators 213A and 213B (e.g., electro-optical modulators) are used to modulate the intensities of the beams 212A and 212B in response to control signals 214A and 214B, respectively, to produce modulated beams 215A and 215B. The control signals 214A and 214B represent two channels of binary digital data so that the temporal intensity modulations of the modulated beams 215A and 215B are replica of the data. The two beams 215A and 215B with orthogonal polarizations are then combined by, e.g., another polarizing beam splitter 216, as the single PDM beam 202. This single PDM beam 202 carries data of the two different channels.

The relative weights of the two orthogonal polarizations $P_1$ and $P_2$ are controlled by controlling the relative intensities of the two beams 212A and 212B at the output of the beam splitter 212. In one implementation, the orientation of the beam splitter 212 may be set relative to the input polarization of the beam 211A to achieve desired PDM coefficients $\alpha$ and $\beta$ for the PDM wave 202 (PDM=$\alpha P_1 + \beta P_2$). A polarization controller, for example, may be disposed in the optical path of 211A before the beam splitter 212 to control the relative intensities of beams 212A and 212B.

The PDM receiving terminal 205 has a photodetector 220 to convert the received PDM wave 204 into an electrical signal 220A. The intensity pattern of the received PDM wave 204 is measured, without recovering polarization information on the polarizations $P_1$ and $P_2$. The signal 220A is then sent to three binary decision circuits 221, 222, and 223, and a clock recovery circuit 240. The clock recovery circuit 240 extracts the clock signal 240A from the signal 220A. This clock signal 240A is then used to control the recovery of the two different channels of data embedded in the signal 220A.

Each binary decision circuit operates to determine logic values of an input signal between two adjacent digital levels. In one implementation, the magnitude of the input signal (i.e., signal 220A) is compared to a selected threshold signal level between the signal levels assigned to the adjacent digital levels. When the input signal is less than the threshold signal level, the input signal is assigned to the lower digital level. Otherwise, the input signal is assigned to the higher digital level. For example, if the digital level of 0 is represented by 0V and 1 is represented by 5V, the threshold signal level for the designated binary decision circuit may be 2.5V, the middle value between 0V and 5V.

In the embodiment shown in FIG. 2, the first binary decision circuit 221 is assigned to determine the logical values of the signal 220A between 0 and 1, the second binary decision circuit 222 is between 1 and 2, and the third binary decision circuit 223 is between 2 and 3. Hence, based on the truth table in TABLE 1, the output 222A of the second binary decision circuit 222 directly represents the binary data in channel 1 without further processing, where the logic value of 2 of the output of 222A represents the binary "1" of the channel 1 and the logic value of 1 of the output 222A represents the binary "0" of the channel 1.

Figure 3:
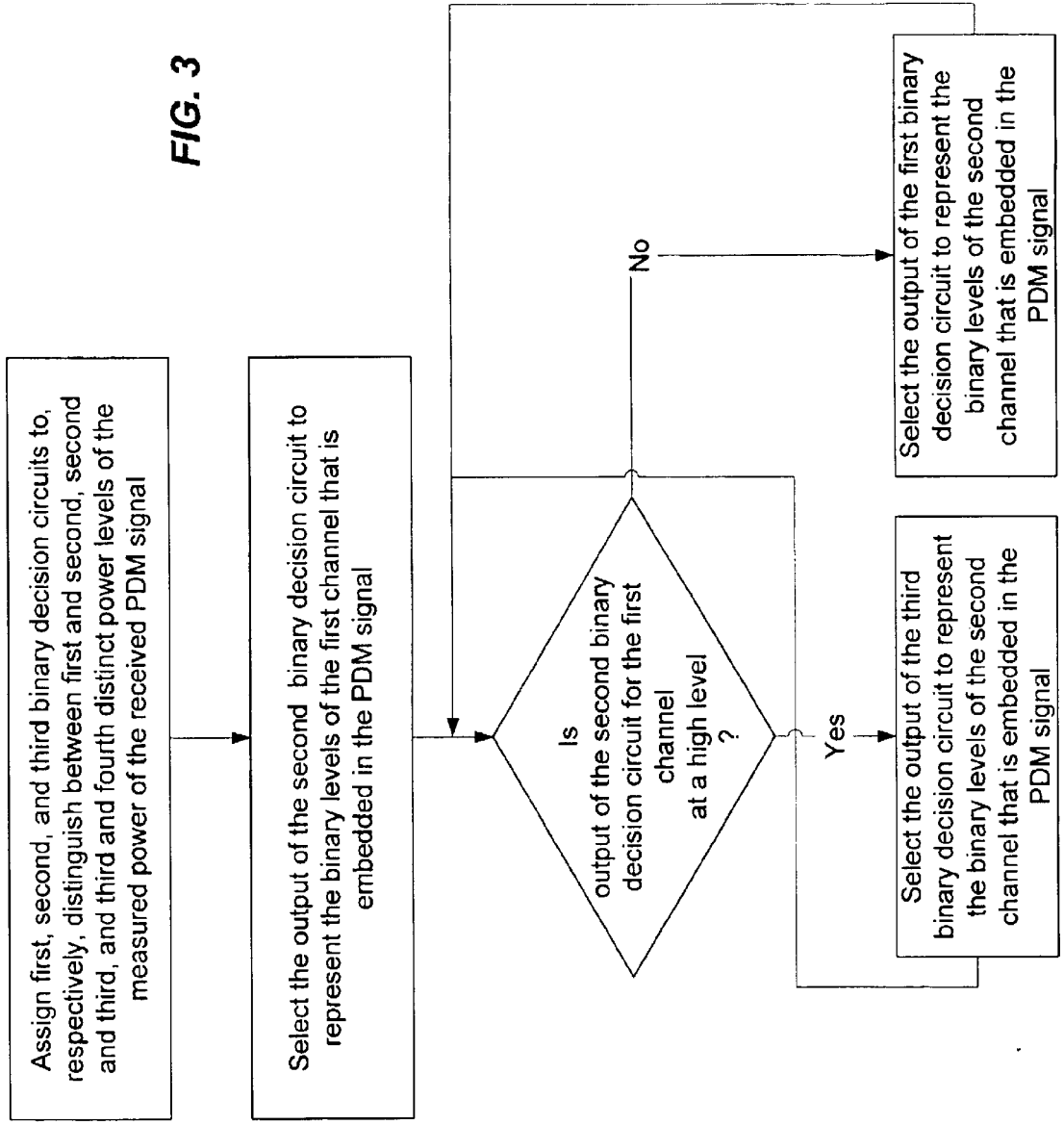
FIG. 3 is a flowchart showing an exemplary workflow of the PDM receiving terminal to recover two different channels of data based on three binary decision circuits.

FIG. 3 shows a flowchart 300 that illustrates the workflow of the three binary decision circuits 221, 222, and 223. When in each polarization, the power representing the binary 1 of the binary state is chosen to be higher than the power for the binary 0 of the binary state, the PDM coefficients $\alpha$ and $\beta$ are selected so that $\alpha P_1 > \beta P_2$. Hence, the PDM signal is coded to have four consecutive logic levels which are represented by first (0), second (1), third (2), and fourth (3) power levels, from low to high. Under this condition, both the first and second lower distinct power levels of the PDM signal correspond to the combination binary states where the channel 1 is at the low logic level 0 and both the third and fourth higher distinct power levels of the PDM signal correspond to the combination binary states where the channel 1 is at the high logic level 1. This is illustrated in the first three columns in TABLE 1. The data of the channel 2 is determined by the output of either the first binary decision circuit 221 or the third binary decision circuit 223 depending on the output of the second binary decision circuit 222.

A 2-to-1 selector circuit 230 is implemented to produce the data of the channel 2 in response to the output 222A. When the output 222A is 1, the selector 230 is controlled to select the output 221A to represent the binary values of the channel 2, where. logic values 1 and 0 of the output 221A represent the binary values 1 and 0 of the channel 2, respectively. When the output 222A is 2, the selector 230 is controlled to select the output 223A to represent the binary values of the channel 2, where logic values 3 and 2 of the output 223A represent the binary values 1 and 0 of the channel 2, respectively.

Figure 4A:
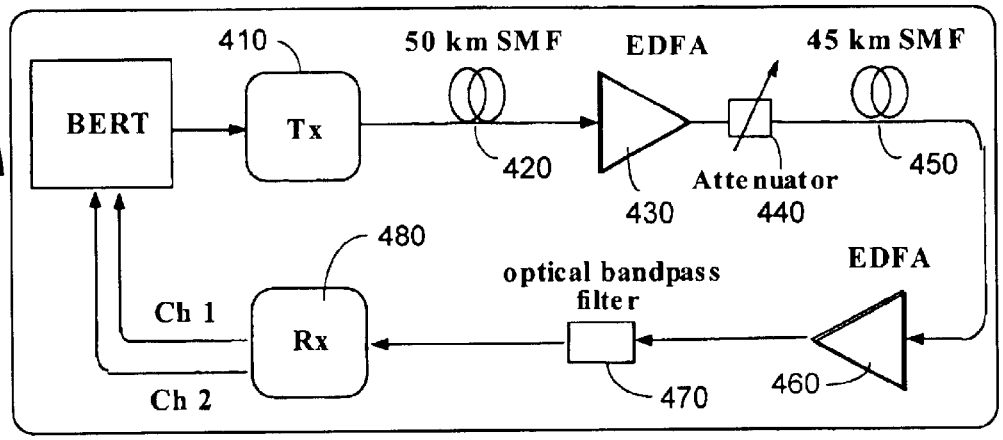
FIGS. 4A, 4B, and 4C show an experimental system for testing the PDM scheme shown in FIGS. 1 and 2.

FIG. 4A shows one exemplary system that demonstrates the operation of the system 200 in FIG. 2 based on the above PDM scheme. The system includes a PDM transmitter 410 and a PDM receiver 480 which are connected by two segments of fiber 420 of 50 km and 450 of 45 km. An EDFA 430 and an optical attenuator 440 are coupled between the fiber segments 420 and 430. An optical bandpass filter 470 and an EDFA 460 are connected to the receiving end of the fiber 450 to couple the PDM signal to the PDM receiver 480.

Figure 4B:
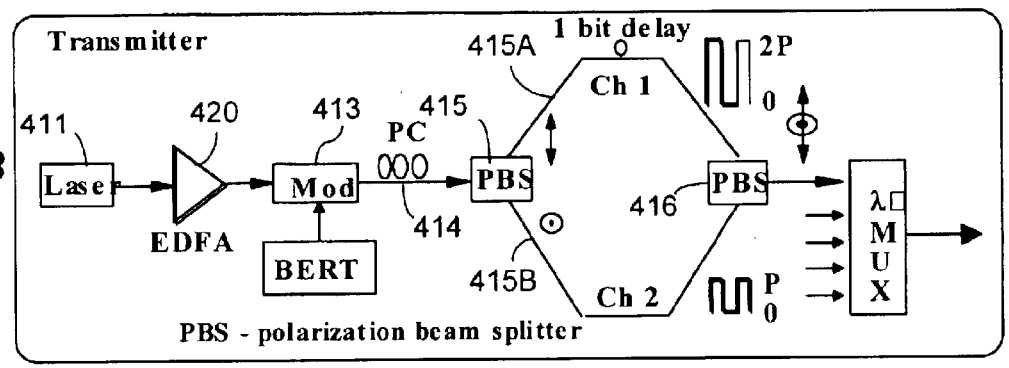
Figure 4C:
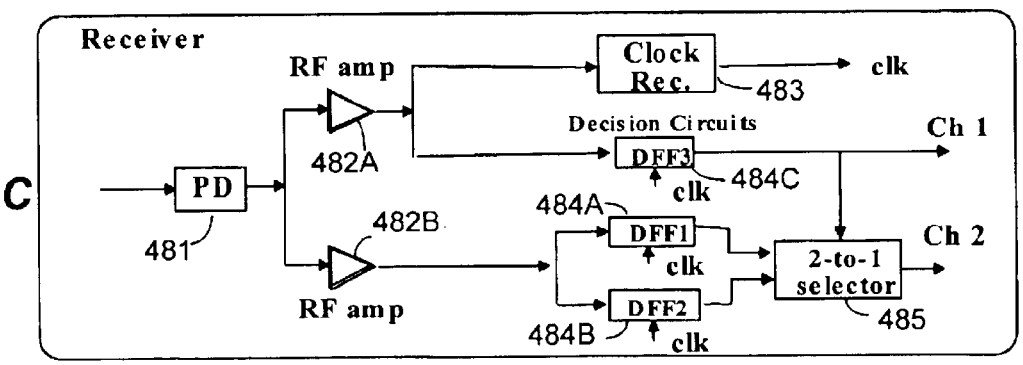

FIGS. 4B and 4C respectively show the components of the PDM transmitter 410 and the PDM receiver 480. A laser 411 and an EDFA 412 are used to generate the carrier optical signal at a carrier wavelength of 1551 nm. A single modulator 413 is used in the transmitter 410 to simulate the effects of two independent modulators 213A and 213B in FIG. 2. This is achieved by introducing a delay by one bit between channels 1 and 2 so the binary data superimposed on the carrier signal are different from each other in the two channels. A PBS 415 splits the modulated carrier into two channels. A polarization controller 414 is used to control the input polarization to the PBS 415 so that the power of the vertical polarized channel 1 in the path 415A is twice of the power of the horizontally polarized channel 2 in the path 415B: $\alpha=2$ and $\beta=1$. A second PBS 416 combines the two channels to produce a PDM output.

The PDM receiver 480 includes a photodetector 481 to convert the optical PDM signal into an electrical PDM signal to represent the power levels of the PDM signal as a function of time. This electrical PDM signal is sent to a clock recovery circuit 483 and 3 decision circuits 484A, 484B, and 484C which are D flip flop circuits with adjustable decision levels. The decision level of the decision circuit 484C is adjusted to determine the power level of the PDM signal between the second and third levels of the four distinct levels and hence produces an output representing the binary data for channel 1. A 2-to-1 selector 485 then selects the output from circuits 484A and 484B to produce the binary data of the channel 2.

Figure 5A:
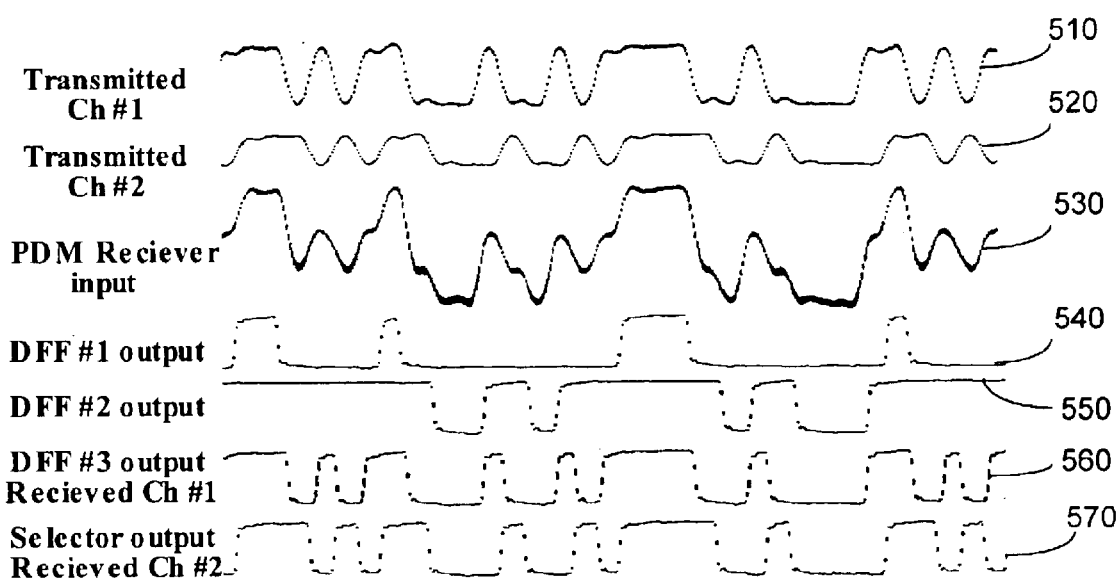
FIG. 5A shows measured signals as a function of time in the system shown in FIGS. 4A, 4B, and 4C.

FIG. 5A shows the measured signals at various locations in the system of FIG. 4A when a $2^{31}-1$ pseudorandom bit stream of 2 Gb/s is fed into the modulator 413 to modulate the laser beam. Signals 510 and 520 are the binary signals for channels 1 and 2, respectively, where the power for the binary "1" in channel 1 is twice as big as the power for the binary "1" in channel 2. Signal 530 is the PDM signal which is shown to have 4 distinct power levels to represent data in both channels 1 and 2. Signals 540, 550, and 560 are the output signals from the three decision circuits, where the signal 560 from the decision circuit 484C is the recovered binary data for channel 1 when compared to the signal 510. The output signal 570 from the selector 485 is the recovered binary data for channel 1.

Figure 5B:
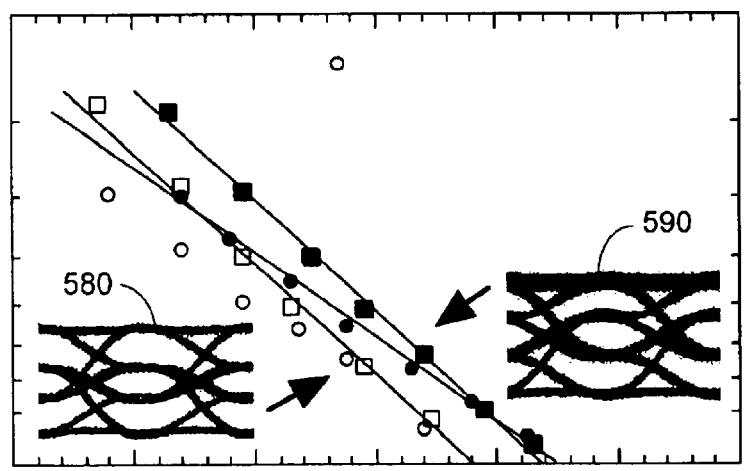
FIG. 5B shows measured BERT and eye diagrams of the system in FIG. 4A with and without a 95-km fiber transmission loop between the PDM transmitting and receiving terminals.

FIG. 5B shows the measured BERT data and eye diagram of the recovered channels 1 and 2 at the receiver 480. Data represented by hollow circles and squares are the measured channels 1 and 2, respectively, when the output of transmitter 410 is directly fed into the receiver 480 without the transmission through the fiber segments 420 and 450. Their respective eye diagrams are shown by the trances 580. In comparison, the eye diagram 590 is measured at the receiver 480 when the output of transmitter 410 is transmitted through a total of 95 km of a fiber path in the dispersive fiber segments 420 and 450. The respective measured channels 1 and 2 are represented by solid circles and squares, respectively. The power penalty for the fiber transmission is less than about 0.5 dB.

In addition to the direct recovery of data from the polarization multiplexed signal, the above PDM scheme has a number of other advantages. For example, the degree of interaction between two orthogonal polarizations due to optical nonlinearities in the fiber path is less in the power unbalanced PDM signal ($\alpha P_1 \neq \beta P_2$) than that in the conventional power balanced signal. See, Inoue, IEEE Photonics Technology Letters, Vol. 3, No. 6, pp. 560–563 (June 1991). Hence the present PDM signal is more resistant to the optical nonlinear effects. In addition, an optical modulator in the embodiment shown in FIGS. 2 and 3 is operated in the binary mode to produce only two different power levels on each polarization. The 4 distinct power levels are achieved by superimposing two 2-level signals of orthogonal polarizations. Hence, each modulated polarization takes the benefit of the full extinction ratio of the respective modulator. If the modulator is used to directly produce 4 different levels, the actual contrast will be less than that of the binary mode. Hence, the performance in the bit error rate can be compromised.

Figure 6:
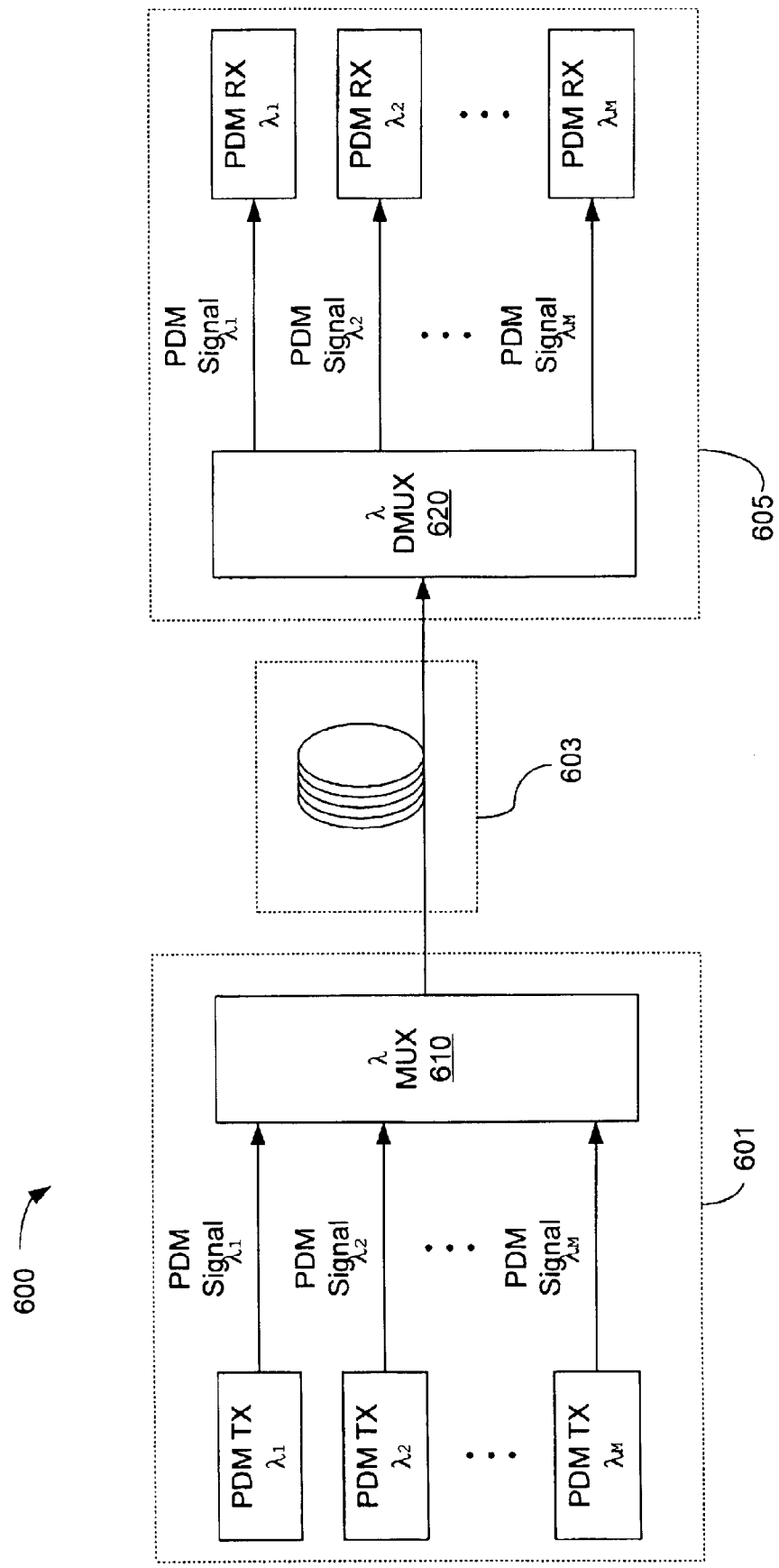
FIG. 6 illustrates a wavelength-division-multiplexing system which implements the present PDM scheme.

FIG. 6 shows a WDM communication system 600 which implements multiple PDM transmitters and receivers based on the present PDM scheme. The PDM scheme allows a two-fold increase in the WDM bandwidth. The system 600 includes a WDM transmitter 601, a fiber line or a fiber network 603, and a WDM receiver 603. The transmitter 601 has multiple PDM transmitters ("PDM TX") and a multiplexer 610 to multiplex the PDM signals into a WDM signal for transmission. The receiver 603 has a demultiplexer 620 to separate different PDM signals at different wavelengths. Multiple PDM receivers ("PDM RX") at the respective wavelengths to recover the two channels of binary data in each PDM signal.

A number of embodiments of the invention have been described. Nevertheless, it will be understood that various modifications and enhancements may be made. For example, each channel in the PDM signal may be a multiplexed channel which has two or more different streams of data. Various signal multiplexing techniques can be used to perform the multiplexing so as to increase the transmission capacity. For example, each channel in the PDM may be a time-division multiplexing ("TDM") or frequency-domain multiplexing. ("FDM") signal. Accordingly, at the receiving end, after the PDM receiver recovers the two polarization multiplexed channels, an appropriate demultiplexing units are included to separate different streams of data.

For another example, the power ratio of the two polarizations may be controlled when the input laser beam is split into two different beams of different polarizations by adjusting the direction of the first PBS 212 in FIG. 2 relative to the polarization of the beam 211A. Alternatively, the two beams 212A and 212B may be at the same power but the direction of the PBS 216A is controlled to achieved the desired power ratio when the two polarizations are combined to form the PDM signal.

These and other variations are intended to be encompassed by the following claims.

What is claimed is:

1. A system, comprising a transmitter which includes:
   a laser to produce an optical carrier wave at a carrier wavelength;
   a first polarization element to separate said optical carrier wave into a first carrier wave of a first polarization and a second carrier wave of a second polarization which is different from said first polarization;
   a first optical modulator to modulate said first carrier wave in response to a first control signal representing a first channel of binary data to produce a first modulated wave of first high and low power levels;
   a second optical modulator to modulate said second carrier wave in response to a second control signal representing a second channel of binary data to produce a second modulated wave of second high and low power levels; and
   a second polarization element to combine said first and said second modulated waves to produce a polarization multiplexed wave whose power has possible four distinct power levels to represent said first and said second channels of binary data.

2. The system as in claim 1, wherein said first high power level of said first modulated wave is different from said second high power level of said second modulated wave.

3. The system as in claim 2, wherein said first low power level and said second low power level are substantially equal.

4. The system as in claim 1, wherein at least one of said first and said second polarization elements is a polarizing beam splitter.

5. A system, comprising:
   a transmitter which includes:
      a laser to produce an optical carrier wave at a carrier wavelength,
      a first polarization element to separate said optical carrier wave into a first carrier wave of a first polarization and a second carrier wave of a second polarization which is different from said first polarization,
      a first optical modulator to modulate said first carrier wave in response to a first control signal representing a first channel of binary data to produce a first modulated wave of first high and low power levels,
      a second optical modulator to modulate said second carrier wave in response to a second control signal representing a second channel of binary data to produce a second modulated wave of second high and low power levels, and
      a second polarization element to combine said first and said second modulated waves to produce a polarization multiplexed wave whose power has possible four distinct power levels to represent said first and said second channels of binary data; and
   a receiver to produce two output signals respectively representing said first and second channels of binary data according to a power of said polarization multiplexed wave with respect to said four distinct power levels, without recovering said first and said second polarizations.

6. The system as in claim 5, wherein said receiver comprises:
   a photodetector to convert said polarization multiplexed wave into an electrical signal whose amplitude represents said four distinct power levels; and
   a decision circuit module to process said electrical signal to produce said two output signals solely based on said amplitude of said electrical signal.

7. The system as in claim 6, wherein said four distinct power levels includes first, second, third, and fourth levels, from low to high, and said decision circuit module includes:
   a first decision circuit to produce a first binary signal from comparing a power of said polarization multiplexed signal with said first and second power levels;
   a second decision circuit to produce a second binary signal to represent one of said first and second channels of binary data from comparing the power of said polarization multiplexed signal with said second and third power levels;
   a third decision circuit to produce a third binary signal from comparing the power of said polarization multiplexed signal with said third and fourth power levels; and
   a selector circuit coupled to said first and third decision circuit to select one value from said first and third binary signals in response to a value of said second binary signal to represent another one of said first and second channels of binary data.

8. The system as in claim 5, further comprising a fiber link between said transmitter and said receiver.

9. The system as in claim 5, further comprising an optical network between said transmitter and said receiver.

10. A system, comprising:
    a transmitter to combine first and second optical beams of different polarizations modulated to respectively carry first and second channels of binary data to produce a polarization multiplexed signal which has unequal power contributions from said different polarizations to have four possible distinct power levels to represent said first and second channels of binary data; and
    a receiver to receive said polarization multiplexed signal and to produce two output signals respectively representing said first and second channels of binary data according to a power level of said polarization multiplexed signal with respect to said four distinct power levels, without recovering said different polarizations.

11. The system as in claim 10, wherein said transmitter includes:
    a laser to produce an optical carrier wave at a carrier wavelength;

a first polarization element to separate said optical carrier wave into a first carrier wave of a first polarization and a second carrier wave of a second polarization which is different from said first polarization;

a first optical modulator to modulate said first carrier wave in response to a first control signal representing said first channel of binary data to produce a first modulated wave;

a second optical modulator to modulate said second carrier wave in response to a second control signal representing said second channel of binary data to produce a second modulated wave; and a second polarization element to combine said first and said second modulated waves to produce said polarization multiplexed signal.

12. The system as in claim 10, wherein said receiver comprises:

a photodetector to convert said polarization multiplexed signal into an electrical signal; and a decision circuit module to process said electrical signal to produce said two output signals solely based on an amplitude of said electrical signal with respect to said four distinct power levels.

13. A system, comprising a wavelength division multiplexing ("WDM") transmitter to produce a WDM signal having a plurality of optical signals at different wavelengths, said WDM transmitter including:

a plurality of polarization division multiplexing ("PDM") transmitters to respectively produce said optical signals, and a multiplexer to combine said optical signals to produce said WDM signal, wherein each PDM transmitter is operable to combine first and second optical beams of different polarizations modulated to respectively carry first and second channels of binary data to produce a respective optical signal which has unequal power contributions from said different polarizations to have four possible distinct power levels to represent said first and second channels of binary data.

14. The system as in claim 13, wherein each PDM transmitter includes;

a laser to produce an optical carrier wave at a carrier wavelength;

a first polarization element to separate said optical carrier wave into a first carrier wave of a first polarization and a second carrier wave of a second polarization which is different from said first polarization;

a first optical modulator to modulate said first carrier wave in response to a first control signal representing said first channel of binary! data to produce a first modulated wave;

a second optical modulator to modulate said second carrier wave in response to a second control signal representing said second channel of binary data to produce a second modulated wave; and a second polarization element to combine said first and said second modulated waves to produce said respective optical signal.

15. The system as in claim 13, wherein at least one optical signal is a multiplexed signal from two different streams of data.

16. A system, comprising:

a wavelength division multiplexing ("WDM") transmitter to produce a WDM signal having a plurality of optical signals at different wavelengths, said WDM transmitter including:

a plurality of polarization division multiplexing ("PDM") transmitters to respectively produce said optical signals, and a multiplexer to combine said optical signals to produce said WDM signal, wherein each PDM transmitter is operable to combine first and second optical beams of different polarizations modulated to respectively carry first and second channels of binary data to produce a respective optical signal which has unequal power contributions from said different polarizations to have four possible distinct power levels to represent said first and second channels of binary data; and a WDM receiver which includes:

a demultiplexer to receive and separate said WDM signal into a plurality of received optical signals at said different wavelengths; and a plurality of PDM receivers, respectively corresponding to said PDM transmitters in said WDM transmitter and processing said received optical signals, to recover said first and second channels in each received optical signal, wherein each PDM receiver produces two output signals respectively representing said first and second channels of binary data according to a power level of a respective received optical signal with respect to said four distinct power levels, without recovering said different polarizations.

17. The system as in claim 16, wherein each PDM receiver comprises:

a photodetector to convert said respective received optical signal into an electrical signal; and a decision circuit module to process said electrical signal to produce said two output signals solely based on an amplitude of said electrical signal with respect to said four distinct power levels.

18. A method, comprising:

producing two optical waves of a common carrier wavelength which are polarized along two different directions;

modulating power levels of said two optical waves to respectively carry two different channels of binary data;

combining said two optical waves to produce a polarization multiplexed wave which is a weighted linear combination of said two optical waves and has four possible distinct power levels to represent information of said two different channels of binary data;

transmitting said polarization multiplexed wave over an optical transmission medium;

receiving said polarization multiplexed wave to measure a power level of the received polarization multiplexed wave, without recovering polarization states of said two optical waves; and comparing said measured power level to said four distinct power levels to retrieve said two different channels of binary data.

19. The method as in claim 18, wherein said four power levels includes, first, second, third, and fourth power levers from low to high in magnitude, and said comparing includes:

comparing said measured power level to said first and second power levers to select one of said first and second power level as a first output;

comparing said measured power level to said second and third power levers to select one of said second and third power level as a second output;

comparing said measured power level to said third and fourth power levers to select one of said third and fourth power level as a third output; and using said first, second, and third outputs to retrieve said two different channels of binary data.

20. The method as in claim 19, wherein said four distinct power levels are selected so that one of said first, second, and third outputs directly represents one channel of binary data, and remaining two outputs represent another channel depending on a binary state of said one channel.

21. A method, comprising:

producing different optical waves of a common carrier wavelength which are polarized along different directions, wherein power levels of said optical waves are modulated to respectively carry different channels of binary data;

combining said optical waves to produce a polarization multiplexed wave which is a weighted linear combination of said optical waves and has at least four possible distinct power levels to represent information of said different channels of binary data; and receiving said polarization multiplexed wave, after transmission through an optical transmission medium, to measure a power level of the received polarization multiplexed wave, without recovering polarization states of said different optical waves prior to said combining, to retrieve said different channels of binary data.

22. The method as in claim 21, wherein said measurement of the power level includes:

converting the received polarization multiplexed wave into an electrical signal;

separating the electrical signal into first, second, third, and fourth signals;

processing the first signal to recover a clock signal;

processing the second signal to determine first and second power levels to produce a first decision signal;

processing the second signal to determine second and third power levels to produce a second decision signal;

processing the second signal to determine third and fourth power levels to produce a third decision signal; and processing said first, said second, and said third decision signals according to said clock signal to extract data for different channels of binary data.

* * * * *